Figure 1:
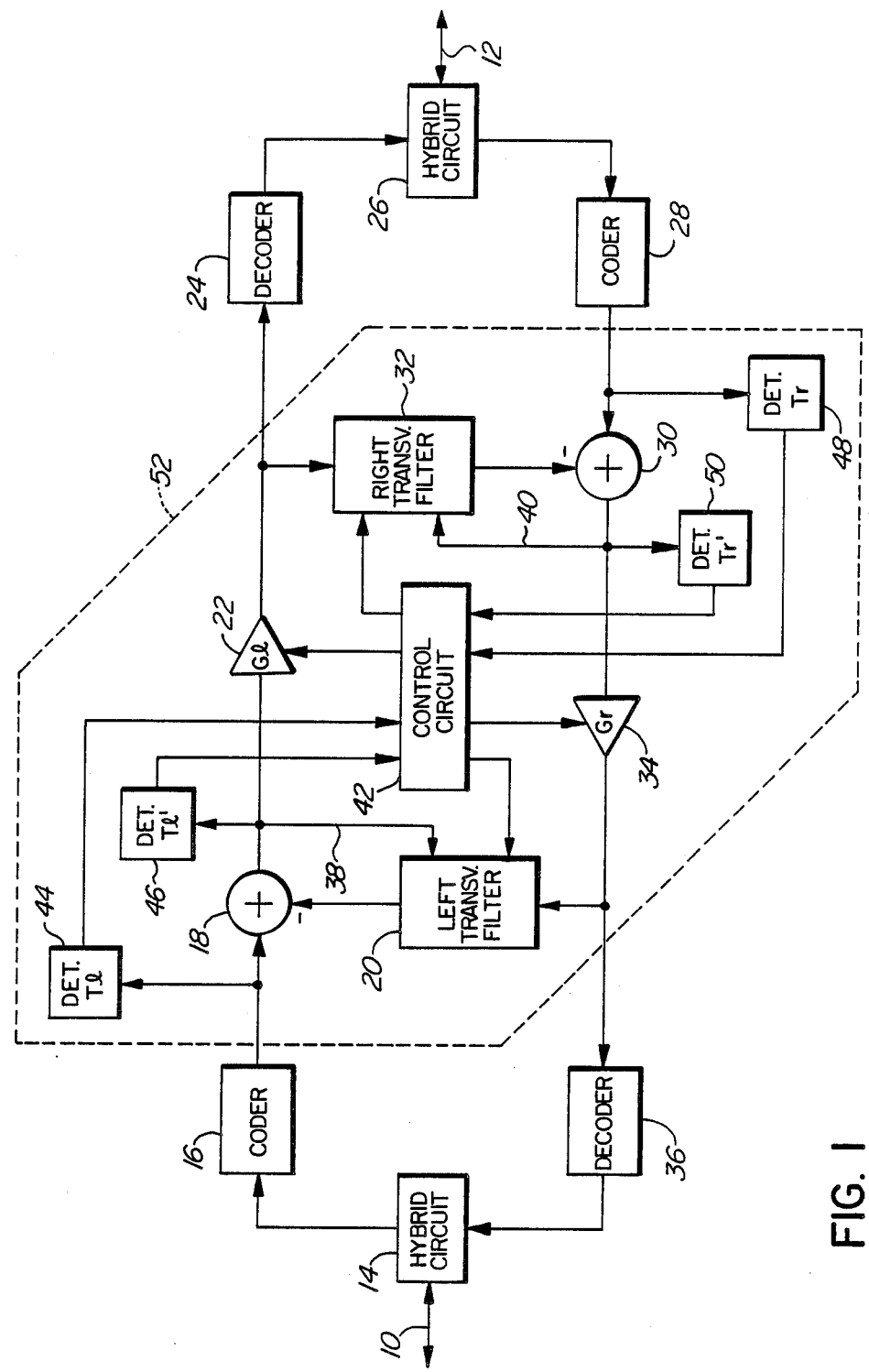

United States Patent [19]

Sylvain et al.

[11] Patent Number: 4,782,525
[45] Date of Patent: Nov. 1, 1988

[54] ECHO CANCELLATION IN TWO-WIRE TRANSMISSION PATH REPEATERS

[75] Inventors: Dany Sylvain, Gatineau; Douglas J. Millar, Verdun; Gilles Dupuis, Brossard, all of Canada

[73] Assignee: Northern Telecom Limited, Montreal, Canada

[21] Appl. No.: 802,292

[22] Filed: Nov. 27, 1985

[51] Int. Cl.$^4$ .............................................. H04B 3/23
[52] U.S. Cl. .................................... 379/410; 370/32.1; 379/345
[58] Field of Search ................ 179/170.2, 170.6, 81 B, 179/170.8; 370/32, 32.1; 379/389, 390, 406, 409, 410, 411

[56] References Cited

U.S. PATENT DOCUMENTS

| | | | |
|---|---|---|---|
| 3,499,999 | 3/1970 | Sondhi | 379/410 |
| 3,500,000 | 3/1970 | Kelly, Jr. et al. | 379/410 |
| 4,074,087 | 2/1978 | Blake, Jr. et al. | 379/344 |
| 4,282,411 | 8/1981 | Stewart | 379/406 |
| 4,360,712 | 11/1982 | Horna | 379/406 |
| 4,426,729 | 1/1984 | Gritton | 381/41 |
| 4,491,701 | 1/1985 | Duttweiler et al. | 364/724 |
| 4,546,216 | 10/1985 | Tegethoff | 370/32.1 |
| 4,577,071 | 3/1986 | Johnston et al. | 379/410 |
| 4,584,441 | 4/1986 | Chance et al. | 370/26 |
| 4,607,146 | 8/1986 | Haass | 379/392 |
| 4,609,787 | 9/1986 | Horna | 379/411 |
| 4,628,156 | 12/1986 | Irvin | 379/410 |

FOREIGN PATENT DOCUMENTS

| | | |
|---|---|---|
| 0042241 | 3/1982 | Japan . |
| 0042242 | 3/1982 | Japan ................................. 379/410 |
| 0003533 | 1/1986 | Japan ................................. 379/410 |

OTHER PUBLICATIONS

"Echo Canceller Utilizing Pseudo-Logarithmic Coding", O. Horna, Conference NTC '77 Conference Record, CA., U.S.A., Dec. 5-7, 1977, pp. 7-1 to 7-8.
Translation of Japanese publication 57-42242, Mar. 9, 1982, translation made Sep. 1987.

*Primary Examiner*—Jin F. Ng
*Assistant Examiner*—Randall S. Vaas
*Attorney, Agent, or Firm*—R. John Haley

[57] ABSTRACT

A two-wire transmission path repeater includes, between two hybrid circuits coupled to the path, an echo canceller and an amplifier for each direction of transmission, each echo canceller including a transversal filter and a subtracting circuit. The power ratio between signals before and after the subtracting circuit of each echo canceller is used to distinguish between simplex and duplex signals. If the power ratio exceeds a given value, which is dependent upon the input signal power, for only one transmission direction then a simplex signal in the opposite direction is determined, the gain of the amplifier for the one transmission direction is reduced, and adaptation of the transversal filter coefficients for the opposite direction is prevented. If the power ratio for both directions falls below the given value then a duplex signal is determined, the gain of both amplifiers is increased and adaptation of the coefficients of both transfer filters is continued for a short period, then the gain of both amplifiers is reduced and adaptation prevented, thereby facilitating stable operation of the repeater.

6 Claims, 2 Drawing Sheets

ECHO CANCELLATION IN TWO-WIRE TRANSMISSION PATH REPEATERS

This invention relates to echo cancellation, and is particularly concerned with the operation of echo cancellers in repeaters in 2-wire bidirectional transmission paths.

It is well known to use echo cancellation techniques to reduce echoes typically arising from hybrid junctions between 2-wire and 4-wire transmission paths. For example, Kelly, Jr. et al. U.S. Pat. No. 3,500,000 entitled "Self-Adaptive Echo Canceler" illustrates echo cancellers, each comprising a transversal filter and a subtracting circuit, provided at opposite ends of a 4-wire transmission path adjacent to respective hybrid junctions to 2-wire transmission paths.

In order to provide for amplification and equalization of signals, such as voice frequency signals, transmitted in both directions via a 2-wire transmission path, it is known to provide a repeater including equalizing amplifiers for signals in the two transmission directions. As the amplifiers operate as 4-wire devices, i.e. separately for the two transmission directions, such a repeater also includes hybrid circuits for converting between the 2-wire and 4-wire paths, and echo cancellers for cancelling the local echoes produced by these hybrid circuits. Thus such a repeater has the general configuration of a 4-wire transmission network as illustrated in the above-mentioned patent, except that the long-distance, and consequently attenuating, 4-wire path of such network is replaced by local connections via amplifiers providing gain.

The presence of amplifiers providing gain in the signal paths between two echo cancellers in such a repeater gives rise to stability problems in certain operating conditions in the presence of simplex (one-way only) and full duplex (simultaneous both-way) signals. In particular, such problems arise from a divergence of the coefficients of the transversal filters, away from their optimum values, under the influence of residual echo signal components.

An object of this invention, therefore, is to provide improved repeater apparatus and improved methods of operation of such apparatus.

According to one aspect this invention provides apparatus comprising: hybrid circuit means for coupling a two-wire transmission path to four-wire transmit and receive paths; echo cancelling means in the four-wire transmit path for cancelling echoes on the transmit path of signals on the receive path; amplifying means for amplifying signals on the transmit path; and control means responsive to the power ratio between signals on the transmit path before and after the echo cancelling means for controlling the gain of the amplifying means.

According to another aspect of this invention there is provided a repeater for a 2-wire bidirectional transmission line, the repeater comprising: two unidirectional transmission paths, one for each transmission direction, each comprising echo cancelling means and amplifying means; two hybrid circuits for coupling the unidirectional transmission paths in the 2-wire transmission line; and control means responsive to the power ratio between signals on each unidirectional transmission path before and after the echo cancelling means for controlling the gain of each amplifying means.

In an embodiment of the invention the control means is responsive to the ratio of the power of signals on either one of the unidirectional transmission paths before the echo cancelling means to the power of signals on the same unidirectional transmission path after the echo cancelling means exceeding a given value to reduce the gain of the amplifying means in that unidirectional transmission path and, where each echo cancelling means comprises a transversal filter having self-adaptive filter coefficients, to prevent adaptation of the filter coefficients of the transversal filter of the echo cancelling means of the other unidirectional transmission path.

Preferably the control means is also responsive to the ratio of the power of signals on each unidirectional transmission path before the echo cancelling means to the power of signals on the same unidirectional transmission path after the echo cancelling means both falling below a given value to increase the gain of both amplifying means for a predetermined period, and for allowing adaptation of the filter coefficients of both transversal filters during the predetermined period during which the gain of both amplifying means is increased, and for preventing adaptation of the filters coefficients of both transversal filters and decreasing the gain of both amplifying as the end of the predetermined period.

Figure 2:
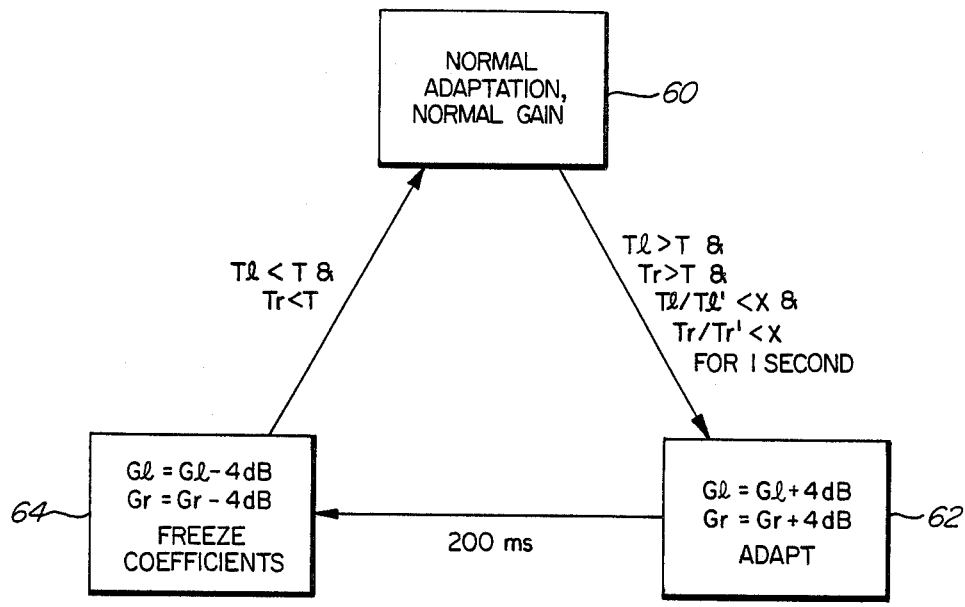
Figure 3:
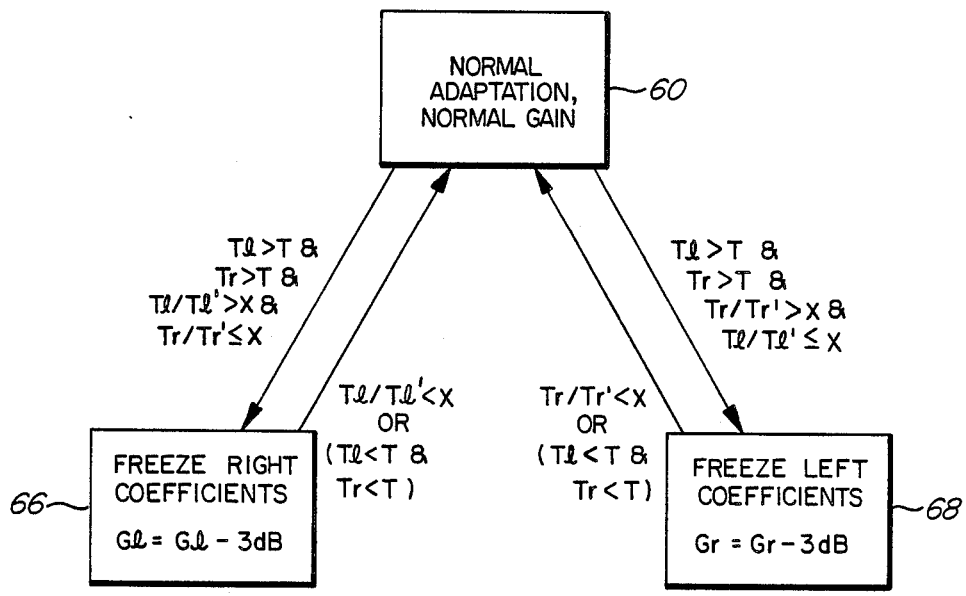

The invention will be further understood from the following description with reference to the acompanying drawings, in which:

FIG. 1 schematically illustrates in block diagrammatic form parts of a repeater which operates in accordance with this invention; and FIGS. 2 and 3 are state diagrams illustrating operating states of the repeater of FIG. 1.

Referring to FIG. 1, parts of a 2-wire repeater for voice frequency signals are shown coupled between 2-wire bidirectional transmission lines 10 and 12. For convenience of explanation herein, signals transmitted from the line 10 to the line 12, i.e. from left to right as illustrated in FIG. 1, are referred to as signals of a left channel, and signals transmitted in the opposite direction from right to left as illustrated are referred to as signals of a right channel.

For the left channel, signals from the line 10 are supplied via a hybrid circuit 14 and a coder 16, and via a summer 18 of a left echo canceller which also comprises a left transversal filter 20, to an equalizing amplifier 22 which has a gain Gl (at a given frequency of for example 1 kHz). Equalized and amplified left channel signals from the output of the amplifier 22 are supplied via a decoder 24 and a hybrid circuit 26 to the line 12. The coder 16 and decoder 24, commonly referred to together as a codec, serve in known manner to convert the left channel signals between a digital form for handling within the repeater and an analog form for transmission on the lines 10 and 12.

Conversely, signals for the right channel are supplied from the line 12 via the hybrid circuit 26, a coder 28, a summer 30 which forms with a right transversal filter 32 a right echo canceller, an equalizing amplifier 34 having a gain Gr, a decoder 36, and the hybrid circuit 14 to the line 10.

The left echo canceller serves to cancel echoes of the right channel signals which pass to the left channel via the hybrid circuit 14. To this end, the right channel signal is filtered by the left transversal filter 20 the output of which is supplied to a subtracting (−) input of the summer 18, coefficients of the left transversal filter 20 self-adapting in known manner in dependence upon the left channel signal at the output of the summer 18, supplied to the filter 20 via a line 38. Similarly, echoes of the left channel signal are cancelled by the right echo canceller, adaptation of the coefficients of the right transversal filter 32 being dependent upon the right channel signal at the output of the summer 30 and supplied to the filter 32 via a line 40.

In addition to the known arrangement of components as described above, the repeater includes a control circuit 42 and detectors 44, 46, 48, and 50. The detectors 44 to 50 serve to monitor the signal power of respectively the left channel before and after the summer 18 and the right channel before and after the summer 30, these signal powers being referred to as Tl, Tl', Tr, and Tr' respectively. The control circuit 42 is responsive to the outputs of the detectors 44 to 50 in the manner described in detail below, and serves to control the gains of the amplifiers 22 and 34 and to inhibit or allow adaptation of the coefficients in the transversal filters 20 and 32. Inhibition of the adaptation of the coefficients corresponds to a freezing or holding of the coefficients at their current values, and can be considered to be equivalent to opening the line 38 or 40 to remove the control signal for adaptation in the respective transversal filter.

The above description with respect to FIG. 1 relates to a repeater in accordance with the invention in the form of discrete components, this being preferred for a clear explanation of the invention. In a preferred implementation of this embodiment of the invention, however, all of the components shown within a broken line enclosure 52 in FIG. 1 are constituted by a single mask programmed digital signal processing integrated circuit device (dsp i.c.), for example the Texas Instruments dsp i.c. known by the designation TMS320.

In a known form of repeater, not including the elements 42 to 50 as illustrated in FIG. 1, a problem arises in the case of full duplex signals, for example data signals, which are simultaneously transmitted in the two directions of transmission. In known repeaters a full duplex situation is detected using a double-talk detector, and the adaptation of the transversal filter coefficients is prevented while the double-talk condition is present. A double-talk decision is conventionally reached when for example the signal power Tl at the output of the coder 16 is greater than the signal power Rr at the input of the decoder 36 minus a predetermined level Z; this fails to produce a double-talk decision in the event that $Tl < Rr - Z$ (where the values are expressed in decibels), which is a condition which is quite likely to occur in repeaters where gain is provided by the amplifiers 22 and 34. In addition, it has been found that in practice merely preventing adaptation of the filter coefficients in response to a double-talk condition is not sufficient to ensure reliable data transmission in the presence of gain provided by the amplifiers 22 and 34.

The known form of repeater also exhibits a disadvantage in the case of simplex, or one-way, transmission. For example if a signal is present on the right channel but not on the left channel, then an echo of the right channel signal is present on the left channel and is largely removed by the left echo canceller. However, a residual echo remains at the output of the summer 18. In the prior art this residual echo has been removed by a center clipper (not shown), but this has the disadvantage of introducing a switching effect and removing the desirable subjective feeling of presence over the left channel, this being particularly noticeable due to the gain provided by the amplifier 22. If no center clipping is used, the residual echo is amplified by the amplifier 22 and has an adverse effect on the coefficients in the right transversal filter 32, consequently adversely affecting the transmission path of the right channel signal.

These disadvantages are substantially eliminated by the operation of the repeater illustrated in FIG. 1 with the elements 42 to 50 in the manner described below with reference to the state diagrams in FIGS. 2 and 3, which relate to full duplex and simplex situations respectively.

In each of these situations, for each channel, a measure of the enhancement of echo return loss due to the respective echo canceller is used as a factor in determining the operating state of the repeater. This echo return loss enhancement, or ERLE, for each channel is the ratio of the signal power Tl or Tr, detected by the detector 44 or 48 respectively for the channel before the respective summer 18 or 30, to the signal power Tl' or Tr' detected by the detector 46 or 50 respectively for the channel at the output of the respective summer 18 or 30. In other words, the ERLE is the ratio Tl/Tl' for the left channel and Tr/Tr' for the right channel. If these signal powers are expressed conventionally in decibels as power ratios, then the ERLE is the difference in decibels between the respective power ratios.

The advantage of using the ERLE as a factor in determining the operating state of the repeater is that it facilitates providing a clear distinction of full duplex and simplex situations, even in the presence of gain provided by the amplifiers 22 and 34. For example, in the simplex situation with a right channel relative signal level of 0 dB at the output of the amplifier 34 and no left channel signal, the echo of the right channel signal appearing on the left channel at the output of the coder 16 may be at −3 dB and the left echo canceller may reduce this to −30 dB at the output of the summer 18. This gives an ERLE of $(-3 - -30 =)$ 27 dB, this value being typical of a simplex situation. If a full duplex situation exists, with the same right channel signal level and a left channel signal at a relative level of 0 dB, then the detectors 44 and 46 will both detect power levels of about 0 dB giving an ERLE of 0 dB, this low value being typical of a full duplex situation. If the left channel signal is at a much lower relative power level, for example −12 dB, then the detector 44 detects a level of about −3 dB due to the echo and the detector 46 detects a level of about −12 dB due to the left channel signal, giving an ERLE of $(-3 - -12 =)$ 9 dB, which is still sufficiently small (and clearly distinguishable from the 27 dB figure for the simplex case) to indicate a full duplex situation, even though the left channel signal level is much less than the level of the echo from the right channel.

Referring now to FIG. 2, three states of the control circuit 42, and hence of the repeater as a whole, are illustrated and are referenced 60, 62, and 64. The state 60 is a normal operating state which prevails for example in the absence of signals in both directions of transmission, in which the tranversal filter coefficients adapt themselves in conventional or normal manner and in which the amplifiers 22 and 34 have predetermined normal gains Gl and Gr respectively. The states 62 and 64 relate to full duplex situations as discussed below.

Between the individual states 60, 62, and 64 FIG. 2 illustrates conditions which, if and when satisfied, cause transitions between the states as shown by arrows in FIG. 2. Thus a transition from the state 60 to the state 62 occurs if, for a predetermined period of one second provided to distinguish a full duplex situation (typically data transmission lasting for an extended period of time) from a double-talk situation (typically lasting for a very brief period), the signal power levels Tl and Tr detected by the detectors 44 and 48 are both greater than a threshold level T and the ERLE for the left and right channels are both less than a given ratio X.

The threshold level T is selected to be a low level suitable for distinguishing between signals and noise, and is for example about −40 dBm. The ratio X is selected for convenience for distinguishing between simplex and duplex situations, and may vary in a predetermined manner for each channel in dependence upon the signal power level Tl or Tr which is present on the respective channel. In an embodiment of the invention, for each channel the ratio X is selected to be 12 dB for an input signal power level on the channel of less than −20 dBm and is selected to be 17 dB for an input signal power level on the channel of greater than −20 dBm.

From the above description it should be appreciated that the control circuit 42 responds to the signal power levels detected by the detectors 44 to 50 to reach the state 62 in a full duplex situation. In order to provide for long term stability of operation of the repeater in this situation, this state 62 is adapted for only a short predetermined period of, for example, 200 ms, whereupon the control circuit 42 adopts the state 64 for the remainder of the duration of the full duplex situation. As illustrated in FIG. 2, for the 200 ms period that the control circuit 42 has the state 62, it controls each of the amplifiers 22 and 34 to have a gain which is 4 dB above the normal gain of the respective amplifier, and allows continued adaptation of the coefficients of both of the transversal filters 20 and 32. On entering the state 64, the control circuit 42 controls the amplifiers 22 and 34 to resume their normal gains, (i.e. it decreases the gains of the amplifiers by the same amount of 4 dB) and freezes the coefficients of both transversal filters by preventing continued adaptation.

The result of the above control sequence is that, during the 200 ms period that the state 62 is occupied, the coefficients of the transversal filters are adapted to stablize the repeater circuit (in particular the closed loop via the amplifier 22, filter 32, summer 30, amplifier 34, filter 20, and summer 18) at the increased gain of the amplifiers. On entering the state 64, the coefficients are frozen and the gain of each amplifier is reduced to provide a singing (or oscillation) margin of 4 dB. This margin is sufficient to ensure long term stability of the repeater.

As also illustrated in FIG. 2, the state 64 is maintained until both of the signal power levels Tl and Tr fall below the threshold level T, indicating that the full duplex situation has ended. In this case the normal state 60 is resumed.

Referring now to FIG. 3, the normal state 60 of the control circuit 42 is shown with two states 66 and 68 which correspond to simplex transmission states for signals on respectively the right and left channels only. As the state 68, and the transitions between this state and the normal state 60, are the converse to those for the state 66, merely relating to transmission in the opposite direction, a detailed description of these is not necessary.

As illustrated in FIG. 3, a simplex state of a signal on only the right channel causes a transition from the normal state 60 to the state 66 by detection of signal powers Tl (this being an echo) and Tr by the detectors 44 and 48 which are greater than the threshold level T, by the detection of an ERLE for the left channel which is greater than the ratio X, and by the detection of an ERLE for the right channel which is less than or equal to the ratio X, the threshold level T and the ratio X having the same values as discussed above. In the state 66, the control circuit 42 prevents continued adaptation of the transversal filter 32, thereby freezing its coefficients so that they do not diverge from their current values, and reduces the gain of the amplifier 22 by 3 dB in order to reduce the level of the residual echo signal on the left channel. This gain reduction and the freezing of the coefficients obviate the need for center clipping as in the prior art.

As also illustrated in FIG. 3, the normal state 60 is resumed from the state 66, the gain of the amplifier 22 being returned to normal and adaptation of the filter 32 being resumed, in response to either the ERLE of the left channel falling below the ratio X or both of the signal power levels Tl and Tr falling below the threshold level T.

Whilst a particular embodiment of the invention has been described in detail, it should be appreciated that numerous modifications, variations, and adaptations may be made thereto without departing from the scope of the invention as defined in the claims. In particular, it is observed that the invention is not limited to the particular signal power levels, gain changes, and time periods discussed above.

What is claimed is:

1. Apparatus comprising:

a transmit path and a receive path;

echo cancelling means for cancelling echoes on the transmit path of signals on the receive path, the echo cancelling means comprising a transversal filter having adaptive filter coefficients, the echo cancelling means further having a first input coupled to the transmit path, a second input coupled to the receive path, and an output;

substantially linear amplifying means having a controllable gain and having an input coupled to the output of the echo cancelling means; and control means responsive to the power ratio between signals at the first input and the output of the echo cancelling means for controlling the gain of the amplifying means and for controlling adaptation of the filter coefficients;

wherein the control means is responsive to the ratio of the power of signals at the first input of the echo cancelling means to the power of signals at the output of the echo cancelling means falling below a given value to:

increase the gain of the amplifying means for a predetermined period;

allow adaptation of the filter coefficient during the predetermined period; and prevent adaptation of the filter coefficients and decrease the gain of the amplifying means at the end of the predetermined period.

2. Apparatus as claimed in claim 1 wherein the control means is also responsive to the ratio of the power of signals at the first input of the echo cancelling means to the power of signals at the output of the echo cancelling means exceeding a given value to reduce the gain of the amplifying means.

3. A repeater of a 2-wire bidirectional transmission line, the repeater comprising:

two unidirectional transmission paths, one for each transmission direction, each comprising echo cancelling means and substantially linear amplifying means, each echo cancelling means comprising a transveral filter having adaptive filter coefficients and each amplifying means having a controllable gain; and control means responsive to the power ratio between signals on each unidirectional transmission path at an input to and an output of the echo cancelling means for controlling the gain of each amplifying means and for controlling adaptation of the filter coefficients of the transversal filter of each echo cancelling means;

wherein the control means is responsive to said power ratio of both unidirectional transmission paths falling below a given value to:

increase the gain of both amplifying means for a predetermined period;

allow adaptation of the filter coefficients of both transversal filters during the predetermined period; and prevent adaptation of the filter coefficients of both transversal filters and decrease the gain of both amplifying means at the end of the predetermined period.

4. A repeater as claimed in claim 3 wherein, for each unidirectional transmission path, the control means is also responsive to said power ratio for signals on the unidirectional transmission path exceeding a given value to reduce the gain of the amplifying means in the unidirectional transmission path.

5. A repeater as claimed in claim 4 wherein the control means is also responsive to said power ratio for one of the unidirectional transmission paths exceeding a given value to prevent adaptation of the filter coefficients of the transversal filter of the echo cancelling means of the other unidirectional transmission path.

6. A repeater as claimed in claim 3 wherein the control means is also responsive to said power ratio for one of the unidirectional transmission paths exceeding a given value to prevent adaptation of the filter coefficients of the transversal filter of the echo cancelling means of the other unidirectional transmission path.

* * * * *